April 13, 1965 N. H. VOGT ETAL 3,177,521
CARCASS BREAK-UP MEANS
Filed March 23, 1962 8 Sheets-Sheet 1
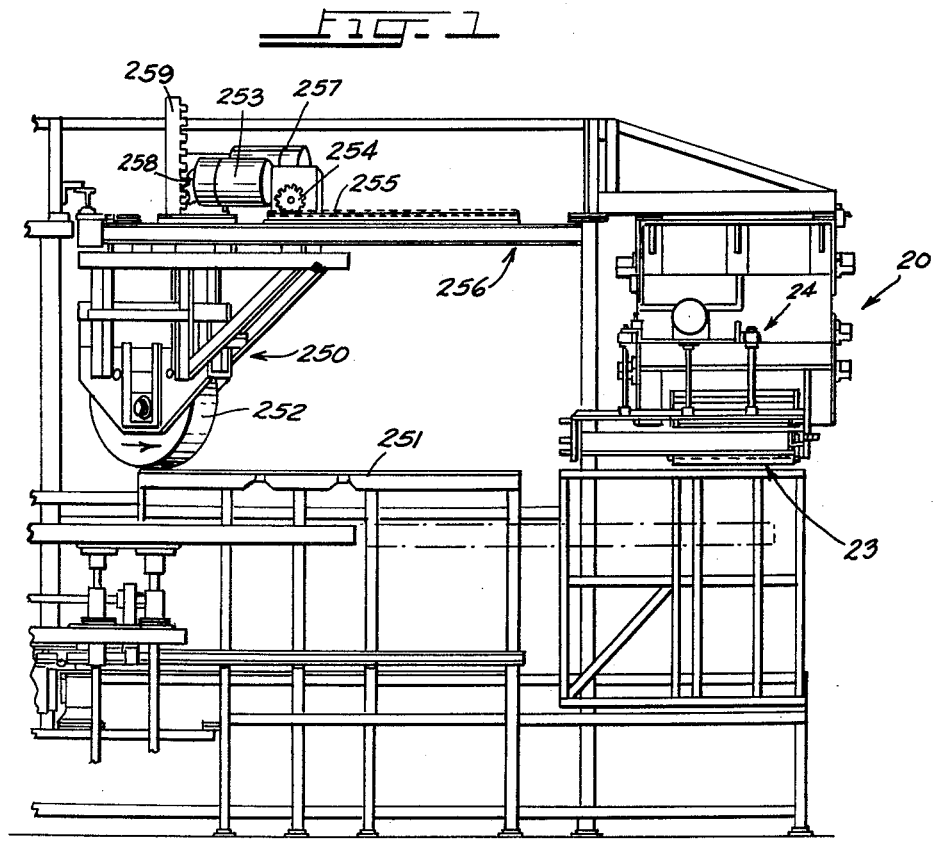
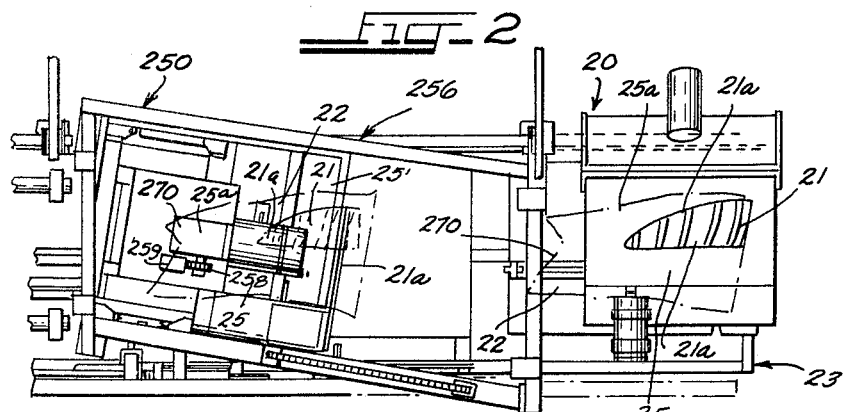
INVENTORS
NORMAN H. VOGT
HARRY W. WEPRIN
HARRY FIELD, JR.
By Carl C. Batz

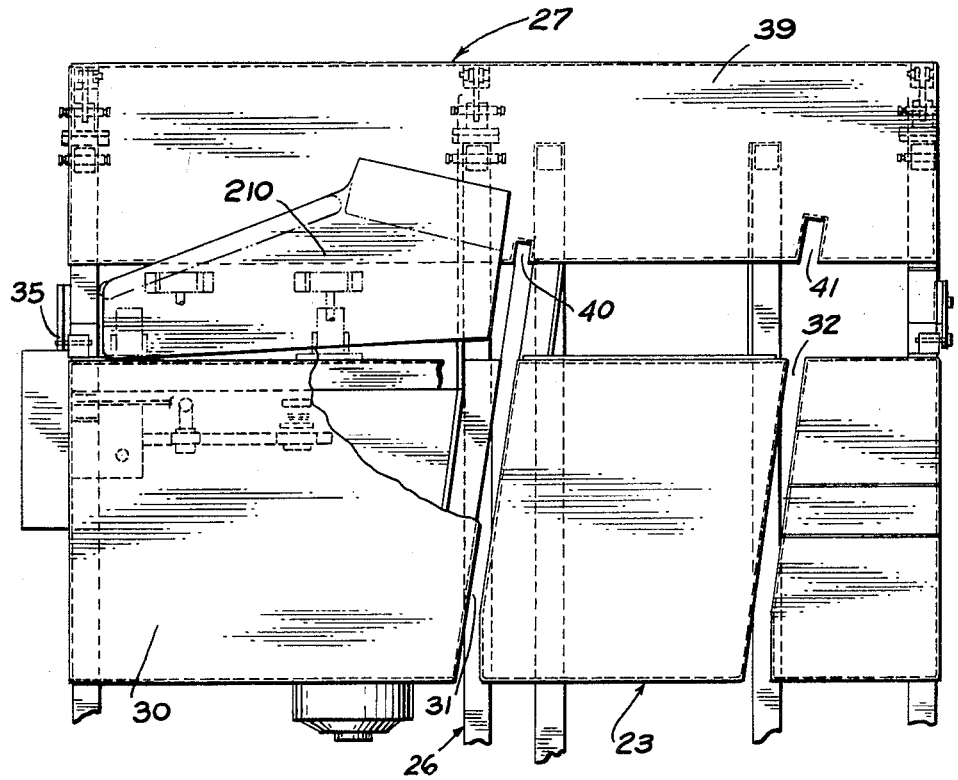

April 13, 1965 N. H. VOGT ETAL 3,177,521
CARCASS BREAK-UP MEANS
Filed March 23, 1962 8 Sheets-Sheet 3
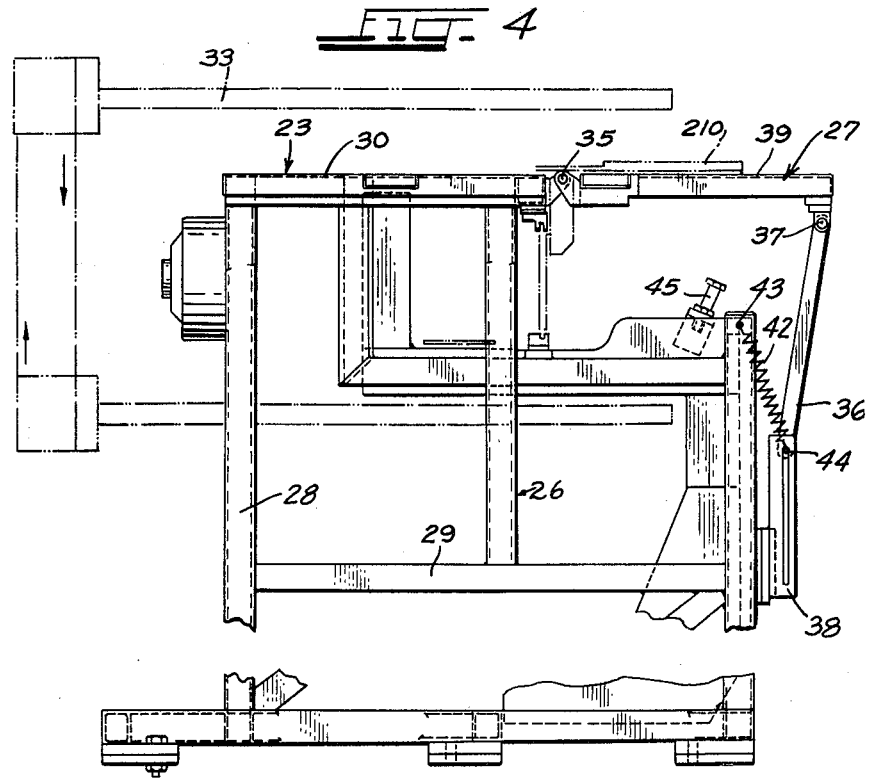
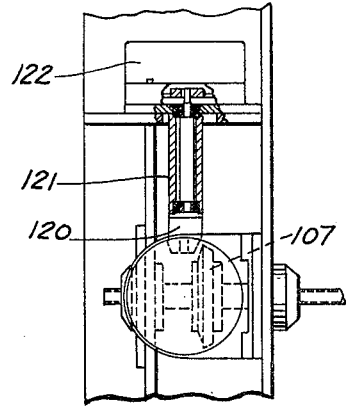
INVENTORS
NORMAN H. VOGT
HARRY W. WEPRIN
HARRY FIELD, JR.
By Carl C. Batz

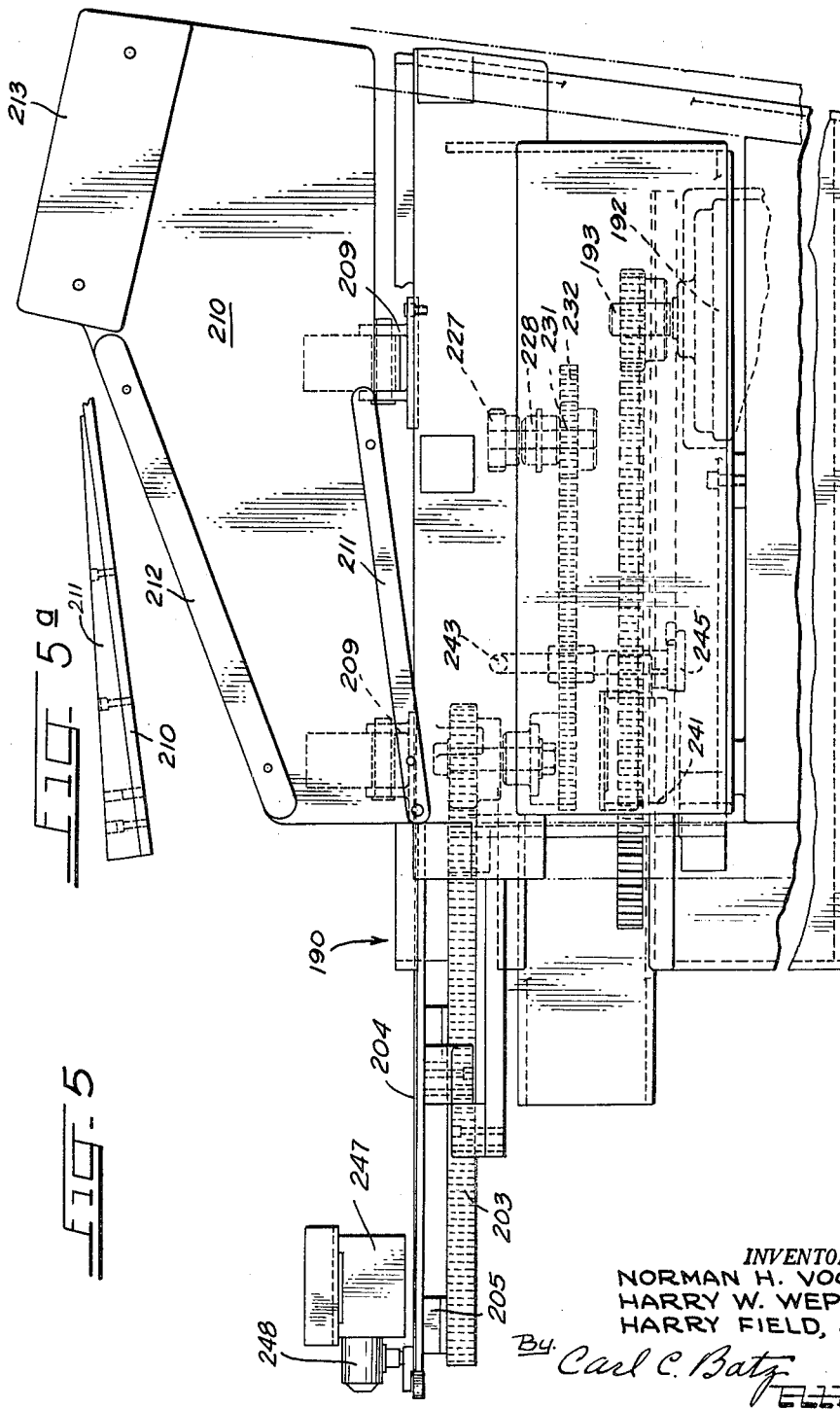

April 13, 1965   N. H. VOGT ETAL   3,177,521
CARCASS BREAK-UP MEANS
Filed March 23, 1962   8 Sheets-Sheet 5
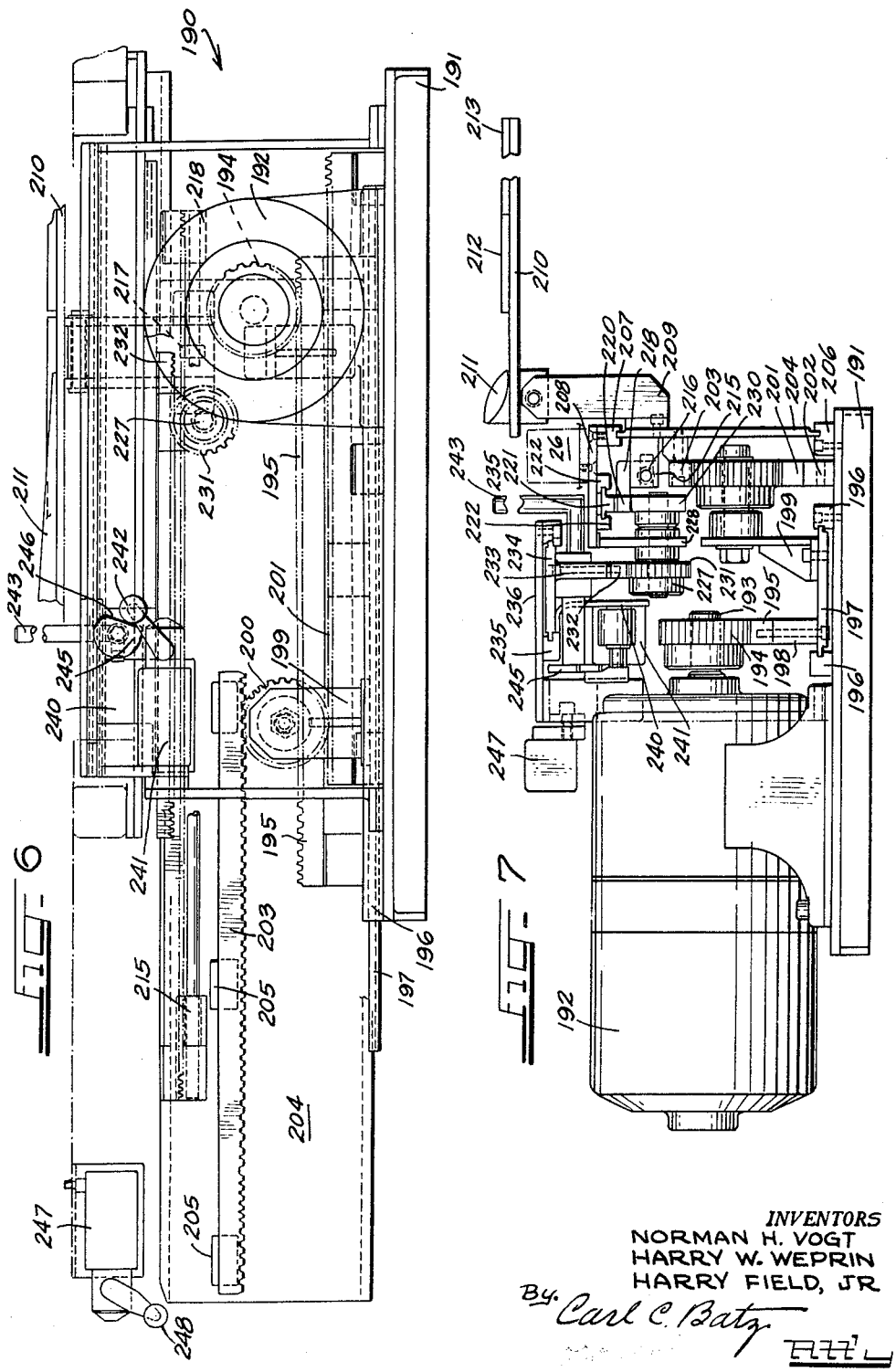
INVENTORS
NORMAN H. VOGT
HARRY W. WEPRIN
HARRY FIELD, JR
BY Carl C. Batz

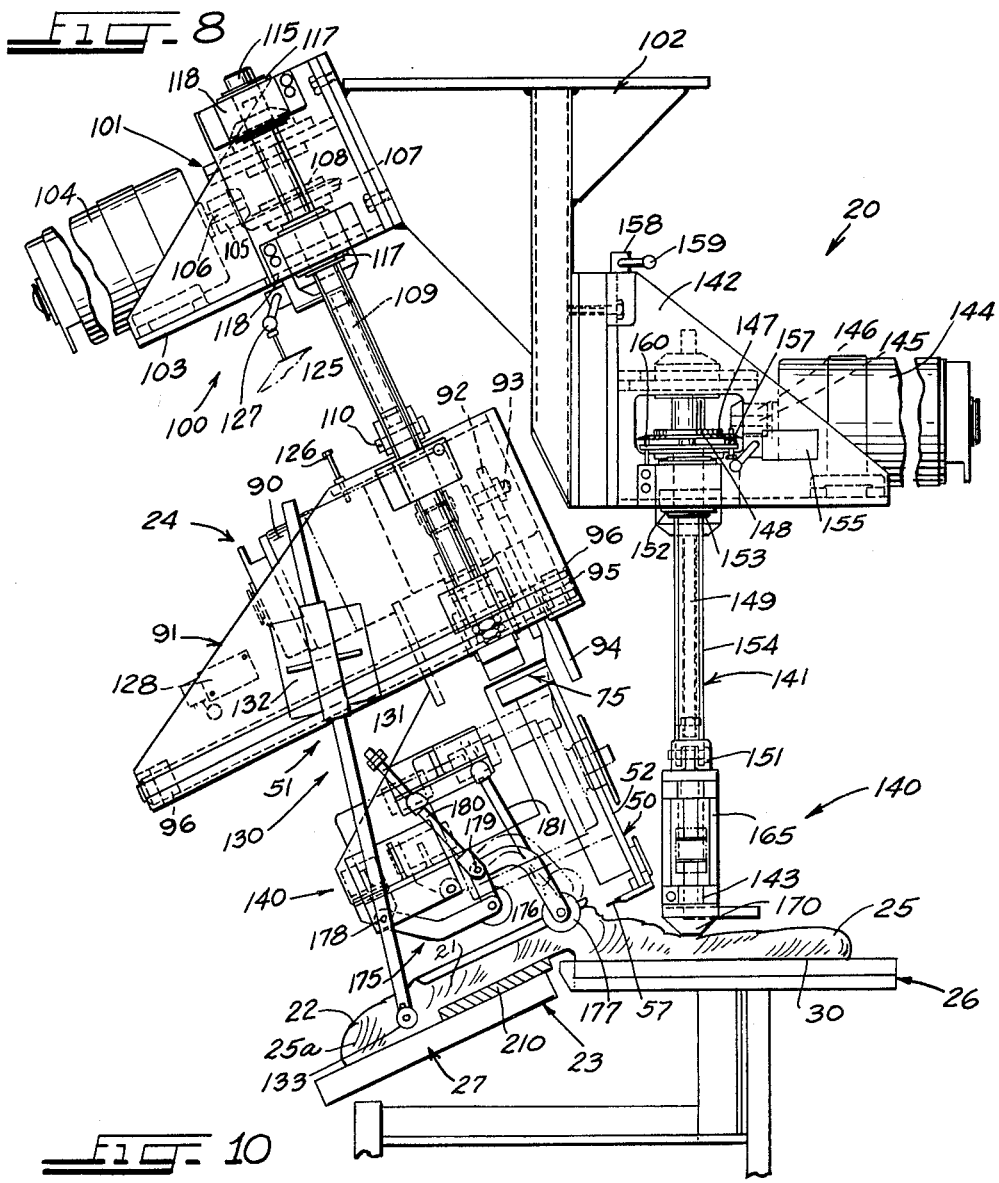

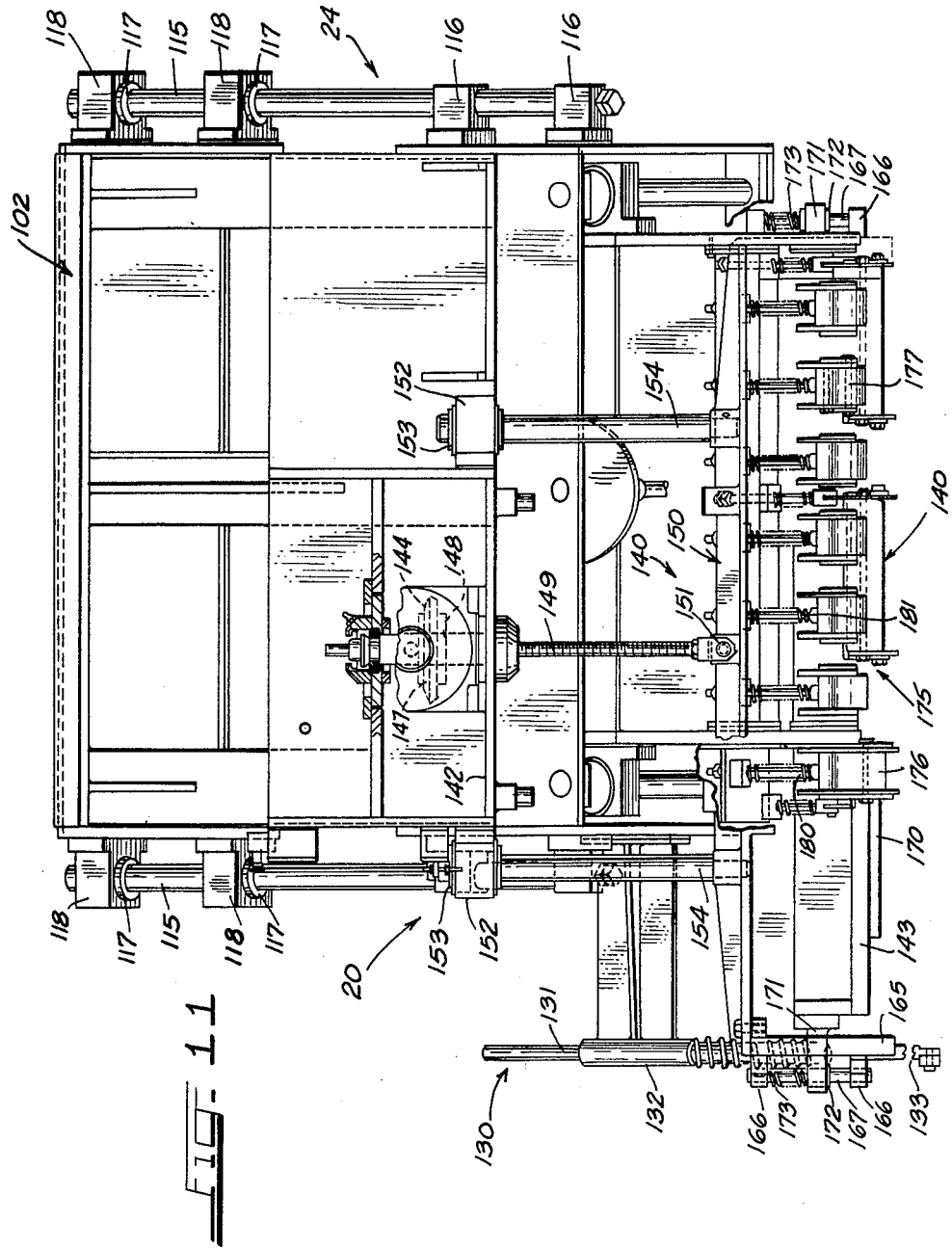

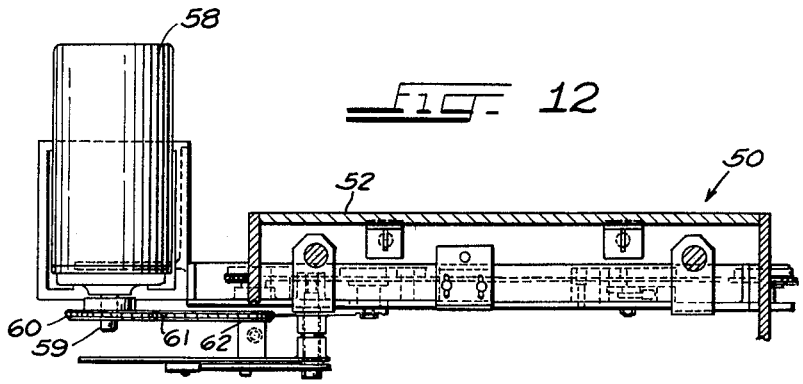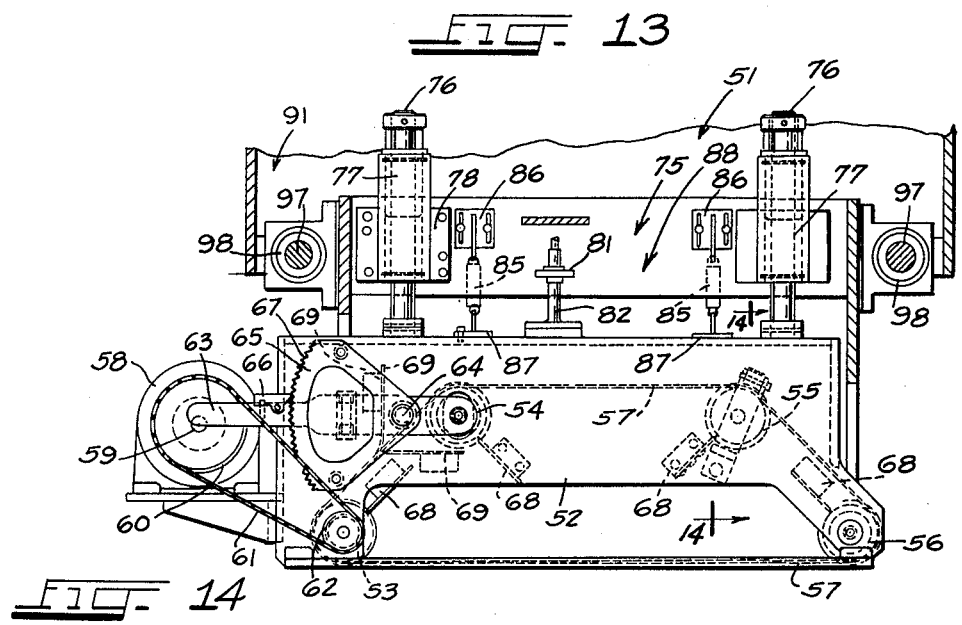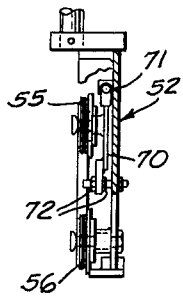

United States Patent Office 3,177,521
Patented Apr. 13, 1965

3,177,521
CARCASS BREAK-UP MEANS
Norman H. Vogt, Clawson, Mich., Harry W. Weprin, Chicago, Ill., and Harry Field, Jr., St. Clair Shores, Mich., assignors to Armour and Company, Chicago, Ill., a corporation of Delaware
Filed Mar. 23, 1962, Ser. No. 181,939
11 Claims. (Cl. 17—1)

This invention relates to carcass break-up means, and it particularly relates to means for removing rib portions from an animal carcass. For the purpose of description, the invention herein described relates to the removal of ribs from a hog carcass.

In the break-up of a hog carcass, it is the usual practice to have an operator manually remove the sparerib portion from the carcass by means of a U-shaped knife. Normally, the spareribs are removed after the ham, shoulder and loin have been removed from the carcass, and after the carcass has been flattened by a roller. In removing the loin from the carcass, the loin ribs are first separated from the spareribs by means of a scribe saw. Generally, the spareribs are considered the portion of the ribs, in the chest region, extending from the middle of the chest approximately to the dividing line between the belly portion and the back portion, or to the scribe line.

In removing the spareribs, the operator ordinarily uses a U-shaped knife and inserts the same between the ribs and the meat portion of the carcass and then pulls the knife in a direction transverse to the length of the ribs. This manual procedure is not only a time consuming operation, but also a difficult operation, since manual force alone is used. Clearly, if this manual operation could be performed by machine, there would be a great saving in time, labor and expense. Therefore, it is a principal object of this invention to provide novel means for the removal of ribs from a hog carcass.

It is a further object of this invention to provide novel apparatus for pulling ribs from a hog carcass, which apparatus removes only a minimum of the valuable belly portion.

It is another object of this invention to provide apparatus which bends the carcass in such a manner that the place of inserting the cutting blade is better exposed.

It is also an object of this invention to provide an apparatus for removing ribs from a hog carcass in a direction longitudinal to the length of the ribs.

Further purposes and objects of the present invention will appear as the specification proceeds.

One embodiment of the present invention is illustrated in the accompanying drawings, wherein:

FIG. 1 is a partially broken, side elevation view of apparatus for rolling a hog carcass and apparatus for pulling ribs from a hog carcass;

FIG. 2 is a top plan view of the embodiment of FIG. 1;

FIG. 3 is a top plan view of apparatus for supporting the hog carcass;

FIG. 4 is an end view, in elevation of the embodiment of FIG. 3;

FIG. 5 is a top plan view of a device for raising the rib portion above the remainder of the carcass;

FIG. 5a is a broken top plan view of a sliding plate means for raising a localized rib-bearing portion of the carcass above the adjacent portions of the carcass;

FIG. 6 is a side view, in elevation of the embodiment of FIG. 5;

FIG. 7 is an end view, in elevation, of the embodiment of FIG. 5;

FIG. 8 is an end view, in elevation and partly in section of apparatus for holding the carcass against the support apparatus and of machinery for removing the ribs from the carcass;

FIG. 9 is a partially broken and partly in section side view of the drive means used for positioning the removing machinery including a showing of a brake;

FIG. 10 is a detail view, partially sectioned, of a solenoid mounted between the cutting apparatus and the apparatus for moving the cutting apparatus;

FIG. 11 is a side view, in elevation and partly in section, of the embodiment of FIG. 8;

FIG. 12 is a partially sectioned, top plan view of apparatus for cutting ribs;

FIG. 13 is a partially sectioned, side view, in elevation, of the embodiment of FIG. 12; and FIG. 14 is a sectional view taken along line 14—14 of FIG. 13.

The rib-removing apparatus to be described may be utilized in connection with the carcass break-up machine described in U.S. patent application Serial No. 77,121, filed December 20, 1960, and in U.S. patent application Serial No. 110,076, filed May 15, 1961. Although the present apparatus may be used as a unitary machine, it is more advantageously utilized in an automated system.

With reference to FIG. 8, the rib-removing apparatus, generally 20, for removing ribs 21 or the rib portion 21a from a hog carcass half 22, generally comprises a table, generally 23, for supporting carcass 22, and apparatus generally 24, for removing ribs 21 in the longitudinal direction. By longitudinal, it is meant that the pulling or removing apparatus 24, moves in the direction of the length of the ribs, or more specifically, from the back side 25 to the belly side 25a of a carcass half 22.

Referring to FIGS. 3 and 4, the support 23 for the carcass 22 includes a stationary frame, generally 26, and a breakaway or rotatable section, generally 27. Frame 26 includes a plurality of support members, such as vertical members 28 and horizontal members 29. Stationary frame 26 is provided with top plate 30 for receiving the carcass 22, top 30 having slots 31 and 32 which are adapted to receive transfer arms 34, shown in phantom view in FIG. 4.

The breakaway or rotatable section 27 is connected to frame 26 by hinges 35 and is adapted to receive that portion of the carcass 22 that contains the rib portion 21a. Guide members 36 are rotatably mounted to breakaway section 27, as at 37, and are slidably positioned in slotted members 38, which are securely fastened to frame 26. Breakaway section 27 is provided with a top 39 which also has slots 40 and 41, which are extensions of slots 31 and 32 in top 30. In order to maintain breakaway section 27 in a generally horizontal position before a carcass 22 is placed thereon, tension springs 42 are provided. Springs 42 are secured to frame 26, as at 43, and also to guide member 36, as at 44. Stop 45 is secured to frame 26 so as to provide a fixed rotated position for breakaway section 27.

The removing or pulling apparatus 24 includes the actual cutting or severing apparatus 50 and also apparatus, generally 51, for moving the cutting apparatus 50 along a path of travel during the pulling operation.

Generally, as shown more clearly in FIGS. 12 through 14, the cutting apparatus 50 includes a frame 52 to which pulleys 53, 54 and 55 and 56 are rotatably mounted. Cutting blade or element 57 may be any suitable means, such as a saw, and is operably positioned around pulleys 53, 54, 55 and 56. Drive means or motor 58 has its shaft 59 secured to sprocket 60 which meshes with chain 61. Chain 61 in turn meshes with sprocket 62 which is fixed to drive pulley 53. Tension adjusting pulley 54 is rotatably mounted on arm 63 which in turn is rotatably secured to frame 52, as at 64. Ratchet member 65 is secured to frame 52, and pawl 66 is rotatably secured to arm 63 and is adapted to engage teeth 67 of ratchet 65. By rotation of arm 63, the tension on blade 57 is adjusted by movement of pulley 54. Pulley 55 is adjusted inward or outward by movement of support 70, which rotatably carries pulley 55 and is hingedly attached to frame 52 at 71. Support 70 is locked in position by tightening lock nuts 72. Also, means 68 are provided to clean pulleys 53, 54, 55 and 56, and means 69 are provided to clean blade 57.

Frame 52 is movably positioned with respect to sliding frame, generally 75, by means of guide rods 76, which are fixed to frame 52 and are slidably positioned in bearings 77, which are fixed to frame 75 by support members 78. As shown in FIG. 10, armature 80 of solenoid 81, is fixed to stem 82, which in turn is secured to frame 52. Since solenoid 81 is fixed to frame 75, armature 80 and frame 52 are maintained in a fixed or slidable position, depending upon whether solenoid 81 is energized or de-energized. Resilient members or springs 85 provide tension so as to maintain frame 52, since they are secured to both supports 86 of frame 75 and supports 87 of frame 52. Springs 85, supports 86 and 87, solenoid 81, armature 80 and stem 82 provide a resilient mounting 88 for the severing apparatus 50 during the cutting operation.

As seen more clearly in FIG. 8, the apparatus 51 for moving cutting means 50 includes frame 75 and drive means or motor 90, which is fixed to frame 91. Gear 92 is fastened to shaft 93 of motor 90 and meshes with gear 94. Gear 94 is secured to ball screw 95 which is rotatably mounted in frame 91, as in bearings 96. Ball screw 95 engages a ball nut (not shown), which carries frame 75. Frame 75 is slidably positioned with respect to frame 91 on guide rods 97, which are secured to frame 91. As shown in FIG. 13, bearings 98 are secured to frame 91 and are slidably positioned on guide rods 97.

Apparatus, generally 100, for positioning removing apparatus 24 includes frame 91 and a lowering device, generally 101, which is secured to overhead frame, generally 102. Lowering device 101 includes base 103 and drive means or motor 104, which is mounted on base 103. Bevel gear 105 is secured to shaft 106 of motor 104 and meshes with bevel gear 107. Bevel gear 107 is secured to ball nut 108, which engages ball screw 109 and which is rotatably mounted on base 103. Ball screw 109 is secured at its lower end, to frame 91, as at 110. Guide rods 115 are secured to supports 116, which are fastened to frame 91, and are slidably positioned in bearings 117, which are mounted in supports 118. Supports 118 are secured to base 103.

Referring to FIG. 9, bevel gear 107 also meshes with bevel gear 120. Gear 120 is secured to shaft 121, which in turn is mounted within brake apparatus 122, which causes ball screw 109 to be maintained in a fixed position after frame 52 has been properly positioned for removal of the rib portion 21a.

Limit switch 125 is fixed to base 103, and upon the return of frame 91 to the starting position, actuator 126 on frame 91 contacts roller actuator 127 of limit switch 125, stopping motor 104. Also, limit switch 128 is secured to frame 92, and when contacted by frame 52 after blade 57 has made its cut, it stops and reverses motor 90.

Secured to the side of frame 91 is the device 130 for turning the breakaway table 27 and includes a rod member 131, which is resiliently mounted in support 132. Rod 131 has a roller member 133 provided for contacting breakaway section 27.

Means, generally 140, are provided for holding the carcass 22 against support 23 and includes apparatus, generally 141, for holding a portion of the carcass 22 against the stationary table 26, and apparatus, generally 175, for holding a portion of the carcass 22 against breakaway table 27.

The apparatus 141 for holding a portion of the carcass 22 against the stationary table 26 includes a base 142 which is securely mounted to overhead frame 102, clamp 143 and drive means or motor 144. Motor 144 has a shaft 145 with a bevel gear 146 secured thereto. Bevel gear 146 meshes with bevel gear 147, which is secured to ball nut 148, which is rotatably mounted on base 142. Ball nut 148 engages ball screw 149, which is fastened to clamp 143 as at 151. Supports 152 are secured to frame 142 and carry bearings 153. Movement of clamp 143 is guided by guide rods 154 which are fixed to frame 150 of clamp 143 and are slidably positioned in bearings 153. Limit switch 155 causes motor 144 to stop the downward movement of clamp 143 when roller 156 is contacted by actuator 157, which is mounted on one of the guide rods 154. Limit switch 158 is secured to frame 142 and causes motor 144 to stop the return movement of clamp 143, when roller 159 is contacted by actuator member 160, which is fastened to one of the guide rods 154.

End members 165 are mounted on frame 150. Guide rod supports 166 are secured to end members 165 and carry guide rods 167. Carcass contacting member 170 is provided with end members 171 which carry bearing members 172. Guide rods 167 are slidably positioned in bearings 172. Springs or resilient members 173 provide resilient force against end members 171.

The apparatus, generally 175, for holding a portion of the carcass 22 against breakaway table 27 includes rollers 176 and 177, which are rotatably mounted to frame 75, as at 178 and 179, and which are resiliently mounted by means of compression spring members 180 and 181. Since roller members 176 and 177 are resiliently and rotatably mounted to frame 75, they maintain different portions of the carcass 22 against the breakaway section 27 as the blade 57 moves in a path of travel during the rib-removing operation.

It has been found to be highly advantageous to provide apparatus, generally 190, for raising the rib portion 21a above the remainder of the carcass 22 for the purpose of providing better positioning at the start of the cutting operation. FIGS. 5, 6 and 7 more clearly illustrate the apparatus 190 for raising rib portion 21a above the carcass 22 and higher above the support 23. The apparatus 190 is mounted on a base 191, to which drive means or motor 192 is also mounted. Shaft 193 of motor 192 holds a gear 194 which meshes with gear rack 195. Guide bars 196 are fastened to base 191 and slidably carry sliding plate 197 upon which is mounted support 198 holding gear rack 195.

Also secured to plate 197 is support 199, to which is rotatably mounted gear 200. Gear 200 meshes with gear rack 201, which is secured to support 202 which in turn is fastened to base 191. Gear 200 also meshes with gear rack 203, which is mounted on vertical sliding plate 204 by means of supports 205. Plate 204 is slidably positioned in support 206, which is secured to base 191, and in support 207, which is secured to plate 208. Hinge supports 209 are fastened to plate 204 and rotatably hold plate member 210, which is slidably positioned beneath the rib position 21a of the carcass 22. Plate 210 is provided with spacers 211, 212, and 213, all parts being made to conform generally to the shape and contour of a rib section 21a.

Also secured to moving plate 204 is contactor 215, which is slidably positioned around and provides support for rod 216, which holds collar 217. Rod 216 is fixedly secured to support member 218 which is secured to gear rack 220 which is mounted on sliding member 221. Member 221 is slidably positioned in guide plates 222, which are secured to support 208.

Shaft 227 is rotatably mounted on support 228 which is fixed to support plate 208 of stationary frame 26. Gear rack 220 meshes with gear 230 which is secured to shaft 227. Gear 231 is also secured to shaft 227 and meshes with gear rack 232 which is mounted on support 233. Support 233 is fastened to sliding plate 234, which is slidably mounted in guide plates 235. Plates 235 are secured to support plate 236 which is mounted on frame 26.

Fastened to sliding plate 234 is switch support 240, upon which is mounted limit switch 241 having roller actuator 242. Angle member 243 is adapted to contact the end of the carcass 22 and is rotatably mounted in support 233. Angle member 243 is fixed to cam member 245, which has a flattened portion 246, which is in contact with roller 242.

Secured to frame 26 is limit switch 247, having roller 248, which is aligned with sliding plate 204.

Now that the apparatus has been described in detail, the operation of the apparatus, including a description of the process will be set forth.

*Operation*

With reference to FIGS. 1 and 2, before the ribs are removed from the carcass 22, the carcass 22 is rolled by rolling apparatus, generally 250, when the carcass half 22 is positioned on table 251. The roller 252 is carried in the direction shown by the arrow in FIG. 1, by means of a motor 253 which causes the rotation of gear 254. Gear 254 meshes with gear rack 255, which is secured to frame 256. So upon rotation of gear 254, the roller assembly 250 and drive means 253 are moved for the rolling operation. Upon reaching the end of the stroke, motor 253 stops and motor 257 starts, causing the rotation of gear 258, raising the apparatus 250 upward, by meshing with gear rack 259. The roller 252 is then carried back by reversing the rotation of gear 254 and is finally dropped downward to the starting position by motor 257. The rolling operation causes the flesh portions to be flattened more than the ribs 21, so the space between the ribs 21 and the flesh portions of the carcass 22 is better adapted to receive blade 57.

After the rolling operation, the carcass 22 is lifted from table 251 by a conveyor mechanism, such as described in U.S. patent application Serial No. 110,076, and is transferred to the rib pulling station, generally 20. The carcass 22, resting upon a suitable conveyor, such as arms 33, is positioned on the support 23. When the carcass 22 is set down, suitable means, such as a contact switch (not shown), causes a number of circuits to be activated, thereby setting up the operation for the removal of the ribs 21.

After the carcass 22 is set down, motor 144 of apparatus 141 for holding the carcass against stationary support 26 is started and causes downward movement of ball screw 149. This movement also moves frame 150 and meat contacting member 170. The downward movement of frame 150 is guided by the sliding movement of guide rods 154 in bearings 153. When member 170 contacts the carcass 22, springs 173 are compressed, so as to hold carcass 22 firmly against support member 23. Motor 144 is stopped when actuator 157 contacts a roller member of limit switch 155. This contact actuates switch 155, which through a relay (not shown), stops motor 144.

Either simultaneously with or after the meat is clamped against stationary table 26 by holding apparatus 141, the apparatus 190 for raising the rib portion 21a above the support 23 is moved into position. As motor 192 is moving, shaft 193 and gear 194 are rotated. Since gear 194 meshes with gear rack 195, sliding plate 197 is moved, causing linear movement of sliding support 199. Linear movement of support 199 rotates gear 200 which moves gear rack 203 and sliding plate 204. Since hinge supports 209 are secured to sliding plate 210, sliding plate 210 is moved into position between breakaway table 27 and the carcass 22.

Since contactor 215 is secured to plate 204 and is slidably positioned around rod 196, it moves along rod 216 until contact is made with collar 217. Upon contacting the collar 217, linear motion is imparted to rod 216 and to rod support 218, which is attached to gear rack 220. Since the rack 220 is also moved in a linear direction, gears 230 and 231 are rotated. Since gear 231 meshes with rack 232, which is fastened to sliding plate 234, sliding movement is ultimately imparted to limit switch 241 and also to angle member 243. As angle member 243 moves in a linear direction, it will contact and be rotated by the trailing portion 270 of the carcass 22. As the angle member 243 is rotated, cam 246 actuates switch 241 by changing the position of roller actuator 242. Upon activation of switch 241, motor 192 is stopped in such a position that the sliding plate 210 is positioned generally beneath the rib portion 21a of the carcass 22, so as to raise the rib portion 21a above the rest of the carcass 22, or higher above the support 23. Since plate 210 is shaped to conform to that of a rib section 21a and since spacers 211, 212 and 213 are contoured to conform to the contour of a rib section, generally, only the rib portion 21a will be raised. Therefore, the apparatus 190 prevents unnecessary removal of portions of the valuable belly portion along with the ribs 21.

After the holding apparatus 141 is in position for maintaining the carcass 22 against the stationary table 26, and after the sliding plate 210 is in position causing the raising of rib section 21a of the carcass 22, the circuit for starting lowering or positioning motor 104 is activated. Motor 104 rotates ball nut 108 which causes downward movement of ball screw 109. Since ball screw 109 is secured to frame 91, frame 91 also moves down, the downward movement being guided by means of guide rods 115 sliding in bearings 117. While being lowered, turning device 130 on frame 91 is also lowered, and when roller 133 contacts rotatable portion 27 of support means 23, rotatable portion 27 is moved into position against stop member 45. Also, means 175 for holding the carcass 22 against rotatable section 27 causes the carcass itself to be bent in such a way that rib portion 21a is generally angularly disposed. Apparatus 175 also causes sliding plate 210 of raising means 190 to be rotated along with breakaway section 27 and carcass 22.

When the blade 57 is in proper alignment for the severing of the ribs 21, a limit switch (not shown) is actuated, causing motor 104 to stop and simultaneously activating brake 122 which maintains ball screw 109 in a fixed position.

When motor 104 is stopped, motor 90 for moving frame 75 is started and rotates gear 92 and the meshing gear 94 which is secured to ball screw 95. Rotation of ball screw 95 rotates the ball nut (not shown) which is mounted on frame 75. This movement therefore imparts movement to frame 52 which carries cutting means 50. Since the rib portion 21a is both raised and bent, blade 57 begins to cut at the proper position between the ribs 21 and the meat of the carcass 22. Approximately as the cutting operation starts, a limit switch (not shown) on frame 91 is contacted by the frame 75 and de-activates solenoid 81, which allows frame 52 to be resiliently maintained with respect to frame 91 by means of springs 85. Springs 85 maintain the blade 57 tightly against ribs 21 so that the blade 57 generally follows the contour of the ribs 21, and generally, unnecessary removal of belly meat is prevented. Further, the cutting operations proceeds in a direction longitudinal to the ribs rather than in a direction transverse to the ribs. It has been found to be advantageous to start the rib cut along the scribe line 275, since the ribs 21 are more widely separated from the meat portions of the carcass 22, after the rolling operation. This wide separation provides adequate space for accurate positioning of the blade 57.

Apparatus 175 for holding the carcass 22 against the rotatable table 27, by means of rollers 176 and 177, progressively maintains portions of the carcass 22, in front of the knife 57, against the breakaway portion 27. Motor 90 continues operating until frame 75 contacts limit switch 128, stopping motor 90 after the ribs 21 have been removed. Springs 85 cause the ribs 21 to be lifted away from the carcass 22 and the ribs 21 then slide off table 27 into appropriate receiving means (not shown).

During the cutting operation, motor 58 operates and through sprockets 60 and 62 and chain 61, pulley 53 is driven and causes saw blade 57 to be moved. In order to keep the blade 50 free from meat or fat, cleaners 67 are provided. Also, cleaners 68 are provided to clean pulleys 53 through 56.

After switch 128 has been actuated, the reverse circuits of motors 90, 104 and 144 are set up. Motor 104 carries frame 91 upward until actuator 126 contacts roller member 127 of limit switch 125, at which time motor 104 stops.

Motor 90 operates until a limit switch (not shown) is contacted stopping motor 90 at the initial starting position.

Further, clamp motor 144 is reversed and raises clamp 143 until actuator 160 contacts roller 159 of limit switch 158, at which time motor 144 stops. After each motor is stopped, the forward circuits are set up, ready for another complete cycle of operation.

The breakaway table 27 is returned to the starting horizontal position ready to receive another hog carcass 22, by means of spring members 42. After clamp 143 is returned to the start position, the carcass 22 is transferred to the next operating station.

Although the process for removing the ribs 21 from the carcass 22 should be readily apparent from the above description, generally, the process includes the steps of transferring the carcass 22 for the removal of the ribs 21, holding the carcass 22 in position, rotating the portion of carcass 22 containing the ribs 21, and then longitudinally removing the ribs 21 from the carcass 22.

While in the foregoing specification there has been a detailed description of one embodiment of the present invention, it is to be understood that all equivalents obvious to those having skill in the art are to be included within the scope of the invention, as claimed.

We claim:

1. In apparatus for removing a portion from an animal carcass, means for supporting said carcass portion and including a breakaway section, means positioned on said breakaway section for raising a localized portion of said carcass above the remaining portion of the carcass, means for turning said breakaway section, said raising means and said localized portion, and means for removing said raised portion from said carcass.

2. The structure of claim 1 in which said breakaway section, raising means and carcass portion are turned downwardly.

3. The structure of claim 1 in which said means for raising the localized portion of the carcass is a slidable member mounted on said breakaway section.

4. In apparatus for removing a portion from an animal carcass, a support means for the carcass equipped with a breakaway section, means engaging a portion of said carcass for holding the same down against said support means, said breakaway section supporting another portion of said carcass and being movable downwardly to bend said carcass, means for raising a portion of the carcass on said breakaway section, and means for removing said raised portion from said carcass.

5. In apparatus for removing ribs from a hog carcass, means for supporting said carcass, positive hold-down means engaging one end portion of said carcass, a breakaway section carried by said first-mentioned means and movable downwardly to bend the remaining portion of said carcass, means on said breakaway section for raising a localized rib-bearing portion of the carcass above the remainder of the carcass, and means for removing said raised ribs in a direction longitudinal to the length of said ribs.

6. In apparatus for removing a portion from an animal carcass, means for supporting said carcass, said means having a breakaway section, means positioned on said breakaway section for raising said portion above the remainder of said carcass, means for turning downwardly said breakaway section, said raising means and said portion, and means for removing said raised portion from said carcass.

7. The structure of claim 6 in which said raising means comprises a slidable plate mounted for movement along said rib-bearing section.

8. In apparatus for removing ribs from a hog carcass, means for supporting said carcass and including a stationary support and a movably-mounted breakaway section, hold-down means for holding a portion of said carcass against said stationary support, means positioned on said breakaway section for raising a localized portion bearing said ribs above the remainder of said carcass, means for turning said breakaway portion downwardly to bend said carcass, and means for removing said ribs from said raised portion of the carcass.

9. Apparatus according to claim 8 in which said last-mentioned means moves in a direction for removing said ribs in a direction longitudinally to the length thereof.

10. Apparatus according to claim 8 in which hold-down means are provided for holding the carcass portion on said breakaway section.

11. The structure of claim 8 in which said removing means are resiliently mounted for contact against said ribs in the removing operation.

References Cited by the Examiner

UNITED STATES PATENTS

| 1,161,039 | 11/15 | Foight et al. | 17—23 X |
| 1,466,429 | 8/23 | Flick | 17—1 |
| 2,510,173 | 6/50 | Horter | 17—23 |
| 2,640,225 | 6/53 | Force et al. | 17—45 |
| 2,932,060 | 4/60 | Massengill | 17—45 |
| 2,962,752 | 12/60 | Massengill | 17—1 |

SAMUEL KOREN, *Primary Examiner.*

CARL W. ROBINSON, LUCIE H. LAUDENSLAGER,
*Examiners.*